April 10, 1951 C. L. PAULUS 2,547,968
GYROSTABILIZER

Filed Feb. 13, 1945 2 Sheets-Sheet 1

INVENTOR.
CHARLES L. PAULUS
BY
ATTORNEYS

April 10, 1951 C. L. PAULUS 2,547,968
GYROSTABILIZER
Filed Feb. 13, 1945 2 Sheets-Sheet 2
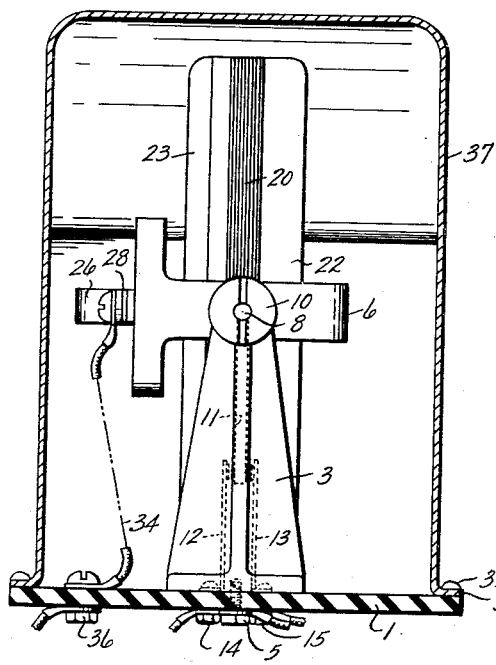
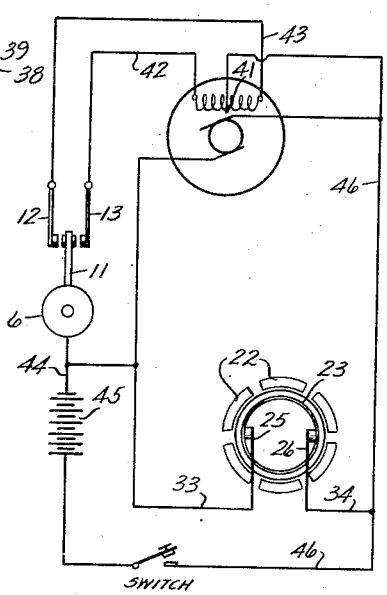
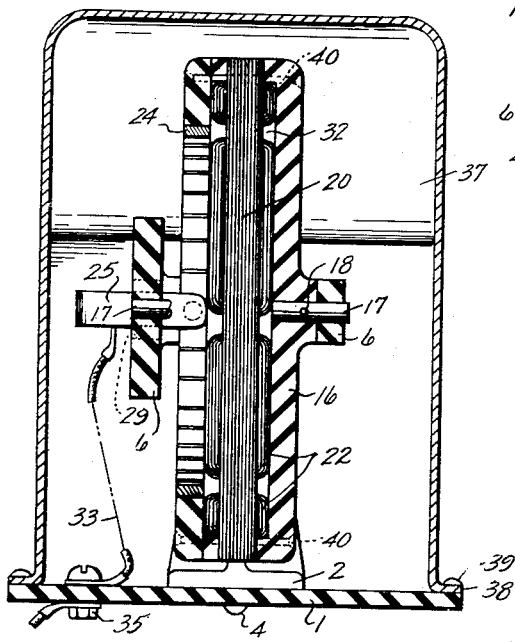
INVENTOR.
CHARLES L. PAULUS
BY
ATTORNEYS Patented Apr. 10, 1951

2,547,968

UNITED STATES PATENT OFFICE 2,547,968

GYROSTABILIZER

Charles L. Paulus, Dayton, Ohio

Application February 13, 1945, Serial No. 577,720

7 Claims. (Cl. 74—5.6)

(Granted under the act of March 3, 1883, as amended April 30, 1928; 370 O. G. 757)

The invention described herein may be manufactured and used by or for Government for governmental purposes, without the payment to me of any royalty thereon.

This invention relates to gyroscope steering control apparatus and has for one of its objects the provision of simple and efficient gyroscope structure, adapted to be economically manufactured with the minimum amount of metal and other strategic material, extremely small in size, rugged, light in weight, and employing electric pickoff control means for controlling the operation of the servo-motor for actuating the steering instrumentalities of dirigible vehicles such as small aircraft, without the use of the usual follow-up means between the servo-motor and the pickoff control means for the gyroscope.

Another object of the invention is the provision of a gyroscope construction employing a unitary pickoff control means for the actuation of a servomotor steering control apparatus, which constitute an erecting device for the rotor spin axis, capable of resiliently resisting abnormal tilting and precession of the rotor spin axis from the predetermined referred position with respect to a support carrying the apparatus, and for causing operation of said servo-motor steering control apparatus during said erection.

A further object is the provision of gyroscope direction control apparatus for steering small aircraft, having a sealed enclosing casing with a rotor therein having a dielectric gimbal member therefor carried within the casing, adapted to employ simple nonprecision bearings for both the rotor and for the gimbal, capable of withstanding excessive shock caused by abnormal acceleration or deceleration of the support, without the liability of damage to the bearing or the necessity of caging the gyroscope rotor during the acceleration or deceleration of the aircraft.

A further object of the invention is to provide a sealed electrically-driven gyroscope device employing dielectric gimbal means having a hollow rotor journaled therein, formed of plastic or mouldable dielectric material having a laminated metallic annulus with armature magnet pole pieces, armature magnet coils, and commutator means disposed within the rotor at a maximum radial distance around the spin axis of the rotor with a fixed permanently magnetized field producing means disposed within the rotor and secured on the gimbal member, and commutator brushes carried by the dielectric gimbal member engaging the commutator means interiorly of the rotor.

A still further object is the provision of a fully-inclosed electrically-driven gyroscope constructed principally of mouldable dielectric or plastic material having a gimbaled plastic rotor with armature coils and commutator means within the rotor cooperating with commutator brushes fixedly carried by the gimbal and extending into the rotor into contacting engagement with the commutator, combined with a combined erecting and electrical pickoff control means, disposed within a casing enclosing the gyroscope, comprising a pair of opposing resilient contact springs mounted in the casing, adapted to be connected to a servo-motor control device, and rigid contact member fixed on the gimbal and extending between said springs arranged to establish electric circuit closing contact with the exterior of the casing through at least one of the gimbal bearings.

A further object of the invention is the provision of opposed electrical circuit closing pickoff contact springs for a direction controlling gyroscope adapted to be mounted stationary with respect to the gyroscope support, and an intermediate electric circuit closing pickoff contact pin fixedly carried by the gimbal for the gyroscope rotor, for establishing an electric circuit closing contact between the pin and one or the other of the springs when the rotor spin axis tilts from a predetermined reference position and simultaneously exerting an erecting torque on the gimbal to restore the rotor to the reference position.

Other objects and advantages of the invention will be apparent from the following description taken in connection with the accompanying drawings in which like reference characters refer to like parts in the several figures.

Fig. 3 is a transverse vertical sectional view taken approximately on line 3—3 in Fig. 2.

Fig. 4 is an end view of my improved groscope device with the casing broken away and in section.

Fig. 5 is a diagrammatic view of a wiring diagram for my improved control device.

Figure 2:
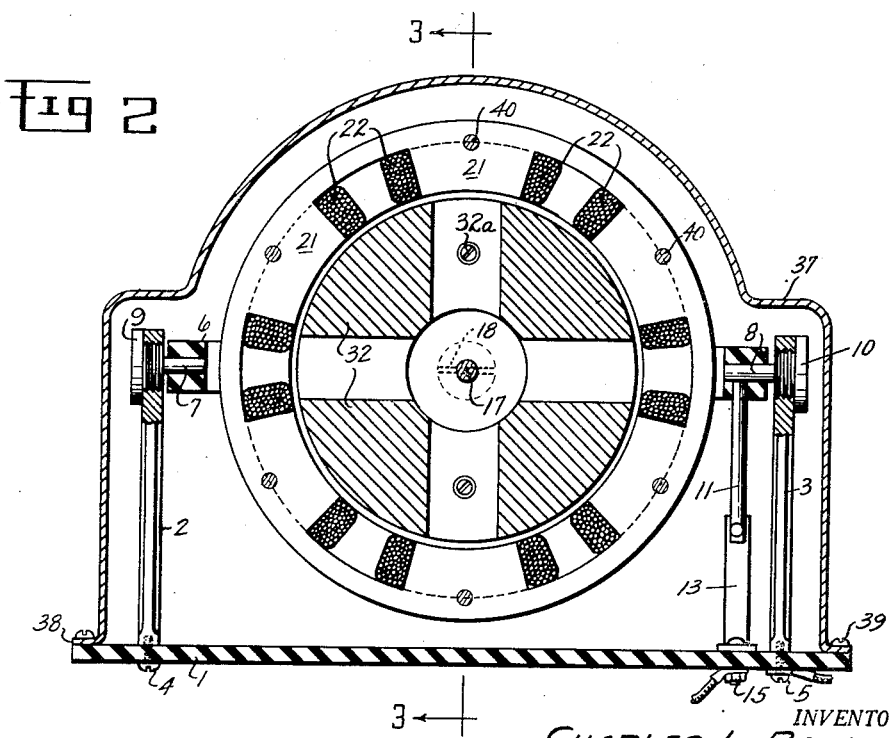
Fig. 2 is a sectional view taken approximately in the plane as indicated by line 2—2 in Fig. 1.

Referring more particularly to Fig. 2 of the drawing, the reference numeral 1 indicates a rectangularly-shaped base, preferably formed of dielectric sheet material, having a pair of spaced supporting standards or posts 2 and 3 secured thereto by the screw fastenings 4 and 5. A dielectric gimbal member 6 formed of plastic or mouldable material is journaled on the standards 2 and 3 on plain bearings 7 and 8, rotatably carried in mounting screws 9 and 10, threaded in suitable openings formed in the upper ends of the standards or posts 2 and 3. The gimbal member 6 carries a rigid contact pin or arm 11, projecting downwardly therefrom. This arm is disposed in electrical contact with the bearing pin or shaft 8 projecting from one end of the gimbal frame 6.

The base member 1 has mounted thereon a pair of spaced contact springs or blades 12 and 13, extending upwardly from the base to points located at opposite sides of the contact arm 11, yieldably resisting tilting of the gimbal frame 6 on its axis. The circuit closing and erecting contact springs 12 and 13 are secured to the base member 1 by bolts 14 and 15 to provide a pair of electric contact terminals on the opposite or outer face of the base member 1.

The dielectric rotor 16 is rotatably journaled within the gimbal frame 6 on a shaft 17, pinned to the rotor as indicated at 18 so that the rotor and shaft rotate together as a unit. The ends of the rotor shaft 17 are journaled in plain or sleeve bearings, in the opposite side portions of the gimbal frame and a press-fit collar 19 secured on the shaft 17 holds the rotor against the axial movement.

Both the rotor member 16 and the gimbal member 6 are preferably formed of plastic or mouldable material so as to be electrically non-conductive, light in weight, easily and cheaply manufactured and assembled.

Figure 1:
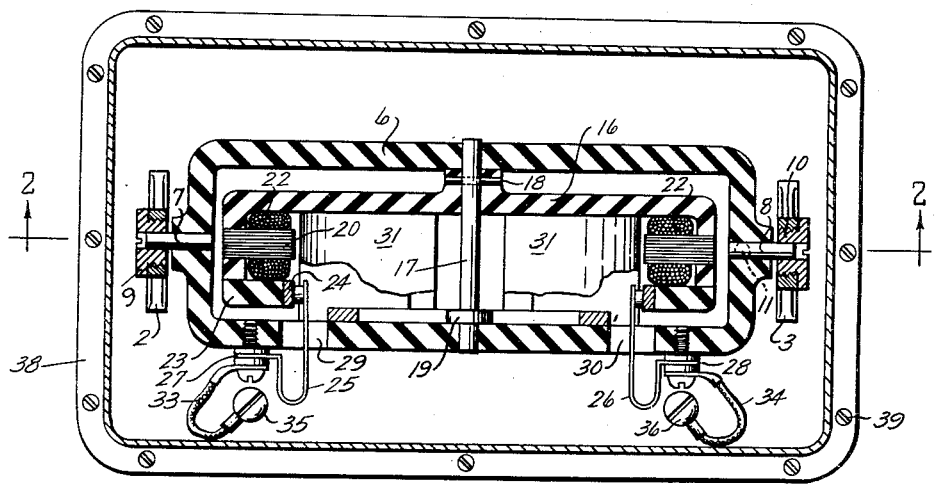
Fig. 1 is a horizontal sectional view taken through my improved gyroscope control device.

The rotor member 16 is provided with an annular laminated metallic ring 20, having a plurality of iron armature magnet pieces 21 formed thereon, each carrying an armature coil 22. These armature coils 22 are located within the annular hollow chamber of the rotor, as best seen in Fig. 1 of the drawings, and a ring commutator 23 is provided around the rim of the rotor, having the usual commutator segments 24 which are connected in the usual manner to the armature coils 22.

Spaced commutator brushes 25 and 26 are secured to the face of the gimbal member 6 by fastening members such as screws 27 and 28, the brushes being rebent upon themselves to pass through openings 29 and 30 formed in the face of the gimbal frame into electrical contacting engagement with the segments 24 forming the commutator ring 23.

A permanent field magnet 31 is secured concentrically within the rotor 16, having a plurality of pole pieces 32. This magnet constitutes a stationary field producing means for the rotor 16 and is secured to the gimbal member 6 by a flange portion extending between the pole pieces, having a screw fastening passing therethrough into the gimbal frame as indicated at 32a. A pair of flexible electrical conductor wires 33 and 34 connect the two brushes 25 and 26 with electrical contact terminals 35 and 36 carried by the base 1.

A thin pressed or moulded shell 37 of dielectric plastic material incloses the gyroscope structure. The shell has a flanged perimeter 38 which is secured to the edge portion of the supporting base member 1 by screw fastenings 39.

While the rotor member 16 may be moulded complete with armature coils and commutator ring therein, the drawings disclose a dielectric or plastic rotor in which the annular metallic laminated ring carrying the armature magnet pole pieces 20, and the commutator ring 23 comprise separate elements which are secured together by rivets 40 passing through the rim of the rotor and the two rings, parallel to the axis of the rotor.

Referring to the wiring diagram shown in Fig. 5, the reference numeral 41 indicates an electric servo-motor of the reversible type, having electrical circuit conductor wires 42 and 43, connected at one end to the resilient contact springs 12 and 13 and at their other ends to the motor field coils. The contact arm 11 is connected by a conductor 44 to the battery 45.

The other side of the battery 45 is connected by a conductor 46 to the other or common terminal of the field coils of the servo-motor 41. The servo-motor 41 is preferably connected to any suitable steering or direction control element, such as the rudder of the aircraft or vehicle carrying the gyroscope control device.

My improved apparatus is particularly adaptable for light and small aircraft, such as target planes, and primarily for planes of this type which are launched by a catapult. The stress and strain on the precision bearing of conventional gyroscopes during these launchings is often so high as to cause damage to these bearings, and the gyroscopes must also be caged during the catapulting to avoid damage to the gyroscope. In my improved gyroscope construction, the precession of the spin axis of the rotor is resiliently resisted by one or the other of the contact springs 12 or 13 without caging of the spin axis, these springs restoring or erecting the gyroscope to its proper reference position, and establish an operating circuit to the servo-motor 41 during this erection.

In the operation of my improved gyroscope control device when used in connection with small radio controlled target airplanes designed to be catapulted into the air, it has been found that two methods of control may be employed. One method is to so space the contacting surfaces of the two spring blades 12 and 13 with respect to the contact arm 11 that is carried by the gimbal frame 6 so that a very minute space between the blades and arm exists when the arm is midway between the two blades. Any deviation or turn in flight of the airplane immediately causes the spin axis of the rotor to precess or tilt with a result that the arm contacts one or the other of the blades establishing a control circuit to the servo-motor, connected to the steering or control surface of the plane which returns the plane to its former course.

An abnormal turn of the plane as caused by wind conditions or by radio control will cause the gimbal to be tilted flexing the spring blade that is engaged. This yieldably resists abnormal tilting of the gimbal frame and the spring blade returns the gimbal to its former reference position, simultaneously the closed circuit between the contacted blade and arm maintains a steering control through the servo-motor tending to return the craft to its course. In radio steered aircraft, special means are usually provided to interrupt the gyroscope control steering effect during a radio turn signal and the contact springs quickly return the spin axis of the rotor to its reference position with respect to the support so that the gyroscope device is ready to take over the steering control at the end of the turn and maintain approximately straight flight.

There may be a slight horizontal back-and-forth movement of the direction of travel of plane carrying the control device, but the average direction will be a straight course.

The springs are resilient, but stiff enough to effectively prevent abnormal precession or tilting of the gimbal or rotor spin axis during excessive acceleration and deceleration of the target airplane due to catapulting the plane into the air and plane landing operations.

Being constructed primarily of dielectric and plastic or mouldable material with the exception of the motor coils, commutator, and circuit connections, my improved gyroscope control device is capable of economical and efficient manufacture in quantities at a minimum expense with minimum use of metal and other strategic material.

A second method of operation of the device is to dispose both contact blades 12 and 13 in contacting relation to the arm 11 carried by the gimbal frame. With this arrangement, both field coils of the servo-motor are always energized, but upon a slight departure of the target plane in either direction from a predetermined course, one or the other of the plates 12 or 13 will be disengaged by the arm 11, causing the contacting relation between the other blade and arm to establish a control circuit to the servo-motor 61 causing the servo-motor to operate the steering control to return the target plane to its former direction of travel.

While I have described my invention in connection with one embodiment, it is obvious that various changes in the construction and arrangement of parts may be made without departing from the spirit of the invention as defined in the appended claims.

I claim:

1. In a gyroscope, a fixed support element, a gimbal element journaled thereon, a rotor carried thereby, means for rotating the rotor, erecting electrical contact means between the fixed support element and the gimbal element comprising a rigid electrical contact arm projecting from one of said gimbal and support elements, a pair of spaced resilient electrical contact and gimbal erecting spring members disposed on the other of said gimbal and support elements at opposite sides of the contact arm in close juxtaposed relation thereto in a plane transverse to the gimbal tilt axis, spaced contact terminals on the support element insulated from each other, one contact terminal being provided for each contact spring member and for said contact arm, and an electrically conductive connection between each of said contact spring members and said contact arm, and said spaced contact terminals.

2. In a gyroscope, a fixed nonmetallic dielectric support, nonmetallic dielectric gimbal frame tiltably carried by said support to tilt on said support, a rotor journaled in said gimbal frame to rotate on an axis perpendicular to the tilting axis of the gimbal frame, means between said gimbal frame and rotor for rotating the latter, an electrical contact arm rigidly projecting from said gimbal frame at an angle to the tilting axis thereof, a pair of spaced opposing resilient electrical contact and gimbal erecting blades fixedly carried by said support in contiguous contacting relation to said contact arm at opposite sides thereof in a plane transverse to the gimbal tilt axis for yieldably resisting tilting movement of the gimbal frame to establish an electrical circuit closing connection between one or the other of said contact blades and said contact arm and to return the rotor spin axis and the gimbal frame to a predetermined reference position when tilted.

3. In a gyroscope of the class described, a fixed support, a rotor gimbaled thereon for two degrees of freedom with respect to the support, opposing resilient electrical contact and gimbal erecting means between the support and gimbal yieldably resisting and limiting the tilting movement of the gimbal with respect to said support, said opposing contact and gimbal erecting means comprising a pair of resilient electrical contact and gimbal erecting springs fixed in spaced relation to each other on said support in a plane transverse to the gimbal tilt axis and an electrical contact arm carried by the gimbal and projecting between said springs for yieldable electrical contacting and gimbal erecting engagement therewith, and separate electrical circuit establishing connections on said support between each of said contact springs and said contact arm, adapted to be connected to a reversible servomotor steering control operating device.

4. In the gyroscope device of the class described having a non-metallic supporting base and a non-metallic gimbal frame tiltably journaled on said base with a rotor journaled in said gimbal frame for rotation on an axis perpendicular to the gimbal frame tilt axis, said rotor comprising a non-metallic body having a hollow annular chamber formed axially therein with an enlarged annular concentric opening at one side thereof a plurality of armature magnet coils and pole pieces secured in said body and exttending radially inward from the annular wall of said chamber, commutator means carried by said rotor comprising commutator segments disposed on the rotor around the enlarged annular concentric side opening in the wall of said chamber and facing inwardly toward the axis of the rotor and electrically connected to said armature magnet coils, commutator brushes carried by said non-metallic gimbal frame exteriorly of the rotor and extending into the annular chamber of the rotor through the side opening into contact with said commutator segments, a magnetic field means fixedly carried by said non-metallic gimbal frame within the annular chamber of the rotor having magnetic field pole pieces disposed adjacent the path of movement of the armature magnet pole pieces, spaced electric circuit connection terminals on said base, flexible electric conductors between said circuit terminals and said commutator brushes and spaced resilient electrical contact blades fixed on the base and an intermediate electrical contact on the gimbal frame for yieldably resisting tilting of the gimbal frame in either direction from a predetermined reference position and establishing electrical contact between the last mentioned contact means during said tilting.

5. In a gyroscope device having a non-metallic base and a non-metallic gimbal frame titlably carried thereby, a rotor journalled on said frame for rotation about an axis fixed on the frame transverse to the frame tilt axis, comprising a hollow non-metallic body of insulating material having spaced side walls with an annular chamber therebetween concentric to the rotor axis having an anlarged concentric side opening formed in one of the side walls, a plurality of armature magnet coils disposed within the chamber between the side walls having pole pieces extending radially from the annular chamber periphery toward the rotor axis, a permanently magnetized field producing means located concentrically within the rotor chamber and fixed on the non-metallic gimbal frame, having a plurality of magnetic poles projecting toward the annular wall of the chamber and terminating in juxtaposed relation to the path of movement of the inner ends of the field coil pole pieces of the rotor, commutator segments fixed in said rotor around the enlarged side opening and facing radially inward and electrically connected to the rotor armature magnet coils, spaced commutator brush contacts fixedly carried by the non-metallic gimbal frame, extending inwardly into the side opening in the rotor into contacting relation with the commutator segments, spaced electrical contacts secured on the non-metallic base and flexible electrical conductors between said base contacts and said commutator brushes.

6. In a gyroscope device with a dielectric supporting base having brackets projecting therefrom in spaced relation to each other and a dielectric gimbal frame tiltably journalled on said gimbal brackets having a rotor journalled thereon for rotation on an axis perpendicular to the gimbal frame tilt axis, said rotor comprising a dielectric body having a hollow annular chamber concentrically formed therein with an enlarged annular concentric side opening, an annular laminated metallic ring in said body surrounding the periphery of said concentric chamber having a plurality of armature coil pole pieces formed thereon, extending radially inward toward the axis of the rotor, armature magnet coils disposed within the annular chamber on said pole pieces, commutator means carried by the rotor around the periphery of the side opening for the chamber comprising commutator segments electrically connecting the armature magnet coils and facing radially inward, commutator brushes carried by said gimbal frame, extending into the rotor chamber through the side opening substantially parallel to the rotor spin axis at opposite sides thereof into contacting engagement with said commutator segments, spaced fixed electrical contact terminals on said dielectric base, flexible electric conductors between said brushes and said fixed spaced contacts, and a permanently magnetized field producing means fixed on said frame concentrically within the annular chamber of the rotor having pole pieces projecting outwardly into juxtaposed relation to the path of travel of the ends of the field magnet pole pieces.

7. In an electrically-driven gyroscope device having a dielectric base, a pair of gimbal brackets mounted on said base in spaced relation, at least one of said brackets being formed of electrically conductive material, a gimbal member formed of dielectric material journaled on said brackets for tilting movement on a longitudinal axis parallel to said base, having at least one electrically conductive journal bearing therefor disposed in said electrically conductive bracket, an electrically condutive contact arm fixed on said gimbal in electrically conductive relation to said electrically conductive journal bearing and projecting outwardly from the gimbal axis toward said base, spaced resilient electrically conductive contact blades projecting from said base toward said gimbal axis at opposite sides of said contact arm, to lie at each side thereof in juxtaposed relation thereto in a plane transverse to the gimbal member tilt axis, to yieldably resist movement of said arm about said gimbal axis in opposite directions from a predetermined reference position with respect to said base, spaced contact terminals disposed on said base, for electrically conductive relation with each of said contact blades, a gyroscope rotor journaled on said gimbal member having a commutator ring, brushes carried by said gimbal member in electrical conductive engagement with said commutator ring, spaced electric terminals for said brushes disposed on the base, and flexible electric conductors between said last-named contact terminals and said brushes.

CHARLES L. PAULUS.

REFERENCES CITED

The following references are of record in the file of this patent:

UNITED STATES PATENTS

| Number | Name | Date |
|---|---|---|
| 1,324,478 | Tanner | Dec. 8, 1919 |
| 1,640,549 | Lamme | Aug. 30, 1927 |
| 1,642,087 | Rosenbaum | Sept. 13, 1927 |
| 1,801,947 | Boykow | Apr. 21, 1931 |
| 1,831,597 | Henderson | Nov. 10, 1931 |
| 1,858,666 | Gilmer | May 17, 1932 |
| 1,883,663 | Fitzgerald | Oct. 18, 1932 |
| 2,046,735 | Frisch et al. | July 7, 1936 |
| 2,053,183 | Crane et al. | Sept. 1, 1936 |
| 2,080,490 | Kollsman | May 18, 1937 |
| 2,186,243 | Hanna | Jan. 9, 1940 |
| 2,220,055 | Fischel et al. | Oct. 29, 1940 |
| 2,381,160 | Hanna | Aug. 7, 1945 |
| 2,385,203 | Hanna | Sept. 18, 1945 |
| 2,389,775 | Hanna et al. | Nov. 26, 1945 |

FOREIGN PATENTS

| Number | Country | Date |
|---|---|---|
| 578,909 | Great Britain | July 17, 1946 |
| 33,738 | The Netherlands | Oct. 15, 1934 |